United States Patent [19]

Farruggia et al.

[11] Patent Number: 5,700,540
[45] Date of Patent: Dec. 23, 1997

[54] OPTICAL RECORDING MEDIUM

[75] Inventors: Giuseppe Farruggia, Webster;
Tukaram K. Hatwar, Penfield;
Michael P. Cunningham, Rochester, all
of N.Y.

[73] Assignee: Eastman Kodak Company, Rochester, N.Y.

[21] Appl. No.: 686,093

[22] Filed: Jul. 24, 1996

[51] Int. Cl.[6] ........................................ B52B 3/00
[52] U.S. Cl. .................... 428/641; 428/642; 428/644;
428/651; 428/694 R; 428/694 ML; 428/694 ST;
428/913; 430/270.12; 430/495.1; 430/945;
369/275.1; 369/283; 369/288
[58] Field of Search ................................ 428/64.1, 64.2,
428/64.4, 64.5, 64.7, 65.1, 688, 694 R,
694 ML, 694 ST, 913; 430/270.12, 270.13,
270.14, 495.1, 945; 369/275.1, 283, 288

[56] References Cited

U.S. PATENT DOCUMENTS 5,407,755  4/1995  Brucker et al. .................... 428/635

*Primary Examiner*—Elizabeth Evans
*Attorney, Agent, or Firm*—Raymond L. Owens

[57] ABSTRACT

An optical recording medium comprising a substrate with grooves, a surface smoothing layer less than 1 μm thickness deposited on the grooved substrate, and a recording layer. The medium reduces noise and improves sensitivity relative to media which do not have a surface smoothing layer.

12 Claims, 6 Drawing Sheets

OPTICAL RECORDING MEDIUM

CROSS REFERENCE TO RELATED APPLICATIONS

The present application is related to U.S. application Ser. No. 60/002,798 filed Aug. 25, 1995 by Yuan-Sheng Tyan, Guiseppe Farruggia, and Tukaram Hatwar entitled "Forming a High Performance CO/PT Disk"; and U.S. application Ser. No. 60/002,797 filed Aug. 25, 1995 by Yuan-Sheng Tyan, Guiseppe Farruggia, and Tukaram Hatwar entitled "Optical Storage Medium Including Multiple Data Levels Made of CO/PT Magneto-optic Recording Media."

FIELD OF THE INVENTION

This invention relates to optical recording medium and, more particularly, it relates to improved medium with decreased noise, increased carrier to noise ratio and enhanced writing sensitivity.

BACKGROUND OF THE INVENTION

It is known that when an optical recording medium is deposited on a grooved polycarbonate (PC) substrate, the disk noise level of the optical disk is significantly higher as compared to an identical medium deposited on the featureless PC or a flat glass substrate. This noise is called groove noise.

In the fabrication of the magneto-optic (MO) disk, Co/Pt multilayers and rare earth-transition metal based amorphous alloys such as TbFeCo have generally been used. Co/Pt multilayers have larger perpendicular magnetic anisotropy, larger Kerr rotations at shorter wavelengths and excellent environmental stability as compared to TbFeCo alloys. Also these multilayers have a larger figure of merit which leads to a high carrier level. They also exhibit, however, a higher noise level. In order to obtain a high carrier to noise ratio, the medium should have both a high carrier level and low noise. The noise level in Co/Pt multilayers depends upon many factors such as magnetic properties, film morphology and the surface quality of the substrate.

PC substrates with continuous or concentric grooves are used for making a MO disk. When the MO layer is deposited on the grooved substrate, the reflectivity of the resulting medium is different at the land and in the groove. The difference in the signal intensity from the land and groove ($I_l-I_g$), generates tracking signals used for tracking purposes. The MO disk should meet certain specifications for push pull signal defined as $(I_1-I_2)/I_o$, as described in the International Standard Organization (ISO) test conditions for MO media, where $(I_1-I_2)$ is the differential output from the split photo diode detector in the optical head and $I_o$ is the signal obtained from the ungrooved and unrecorded portion of the track.

Methods are known to eliminate this groove noise such as sputter etching the underlayer ("Sources of disk noise on a Co/Pt disk" Jpn. J. Appl. Phys. Vol. 32, (193) pp. 3160-62). However, this method is difficult to control.

Another reported method to improve the carrier to noise ratio of the MO disk is by reducing the birefringence of the substrate (Jpn. Patent Application JP06342537A). An organic polymer layer was used to decrease the birefringence of the polycarbonate substrate. The disk performance was improved because of the improved vertical magnetization characteristics of the TbFeCo alloy film. The above application do not mention any media noise reduction. Thin layers of polymer will not change the birefringence of the substrate and, as such, thick layers were used for this purpose. Because the polymeric layer of 10 μm thickness used in this application is too thick and is no longer conformal to the substrate grooves, it will not be possible to track on such a media. Our own experience is that it is very difficult to deposit 10 μm thick uniform polymer layers by the spin coating technique. Also not all the polymers mentioned in the above application improve the performance of the disk.

SUMMARY OF THE INVENTION

An object of the present invention is to provide an improved optical recording media.

Another object is to provide a magneto-optical disk structure using a Co/Pt multilayer with decreased noise level and high performance.

The above objects are achieved with an optical recording medium comprising:

a) a substrate with grooves;

b) a surface smoothing layer less than 1 μm thick deposited on the grooved substrate, and c) a recording layer.

Quite unexpectedly it was found that the substrate groove noise can be reduced significantly by using a thin smoothing layer of monomers on the substrate surface. Such reduction in the noise level becomes more pronounced when the thickness of this surface smoothing layer is below 500 nm.

The above objects are also achieved by magneto-optic media comprising: a substrate, a surface smoothing layer of monomers, a seed layer of In-Sn-O, and a recording multilayer of Co/Pt deposited onto the seed layer. The smoothing layer has a thickness between 20–500 nm and is selected to minimize the substrate groove noise level, improve the writing sensitivity and maintain tracking signals.

It has been found that polymer layers of PMMA and lacquer did not show any improvement in the noise level. Instead these layers increased the noise level. These monomers are very different than the polymers used in the prior art.

ADVANTAGES

1) The smoothing layer of the invention decreases the surface roughness due to the groove structure;

2) The resulting optical recording medium has a reduced noise level and thus increased carrier to noise ratio;

3) It maintains the magneto-optical properties of the recording layer;

4) Smoothing layer does not adversely affect the optical properties of the MO disk structure;

5) It improves the writing sensitivity of the MO disk;

6) Groove structure of the substrate is substantially maintained and the conformality of the smoothing layer is high; and 7) Tracking signals on the MO media are similar to those of media without a smoothing layer.

Table 1 sets forth noise level, carrier to noise ratio and writing power threshold for several disks without and with various smoothing layers; and Table 2 sets forth vertical and in-plane birefringence of the PC substrates without and with a 150 nm smoothing layer of Monomer 1.

DETAILED DESCRIPTION OF THE INVENTION

Figure 1:
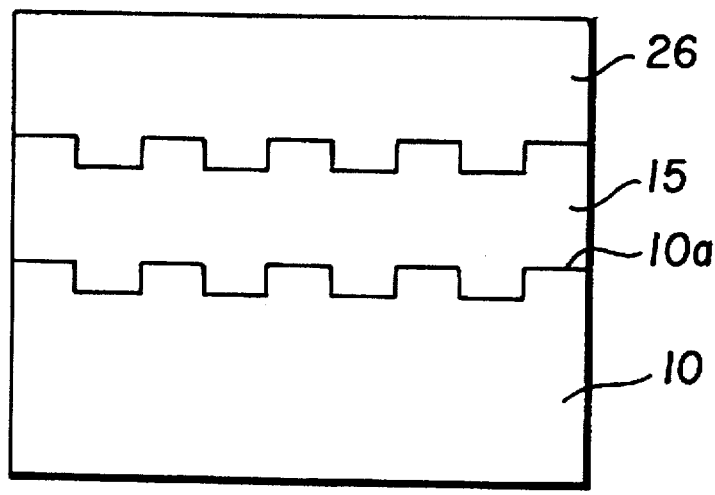
FIG. 1 shows a schematic of a prior art optical recording disk structure.
Figure 2:
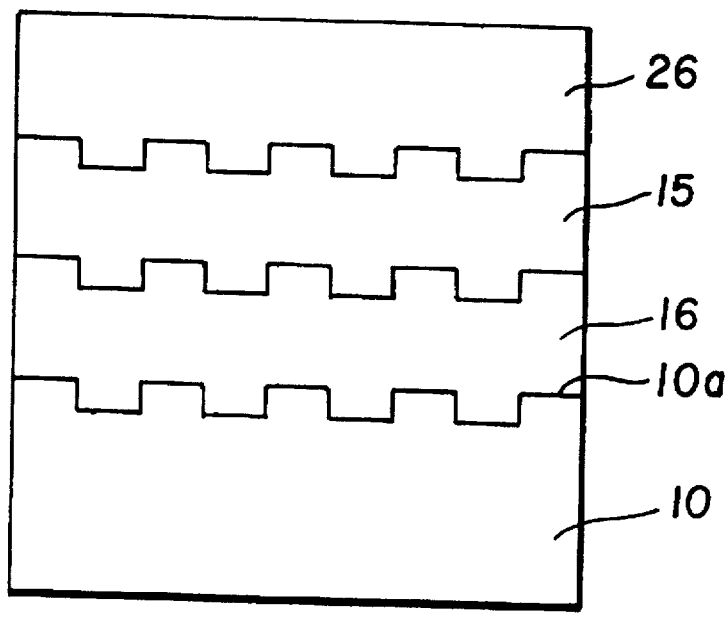
FIG. 2 is a schematic of the optical recording disk in accordance with the invention using a thin smoothing layer of monomers.

FIG. 1 shows a schematic of a prior art disk structure using an optical recording medium. It shows a grooved PC substrate 10 which is made of polycarbonate (PC) and an optical recording layer 15. FIG. 2 shows an optical storage medium in accordance with the present invention. The medium can, of course, be in the form of a disk. Alternative structures can also use the present invention such as optical tape, optical cards, or the like. The structure of FIG. 2 is similar to that of FIG. 1 except that a thin smoothing layer 16 of monomer is deposited on the substrate surface 10a. The optical recording layer in FIG. 2 can be, for example, phase change, dye layer, or a magneto-optic medium.

Figure 3:
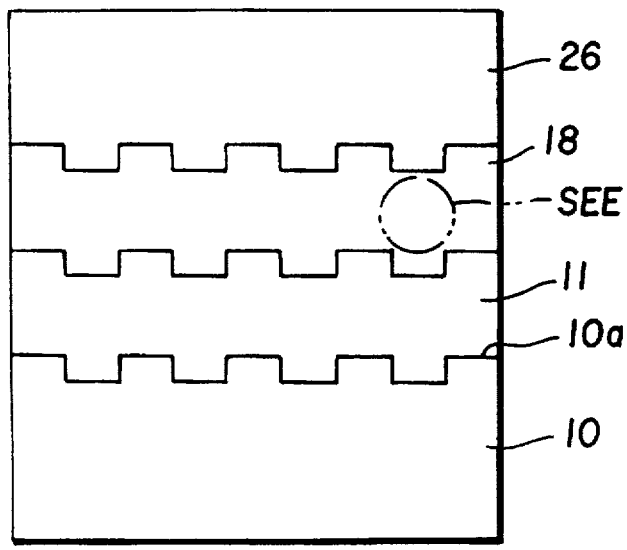
FIG. 3 and 3A show a schematic of the magneto-optical disk structure.
Figure 3A:
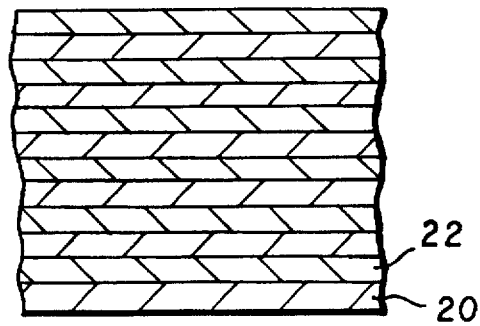

FIG. 3 and 3A show a schematic of a magneto-optical disk. It shows a grooved PC substrate 10 and a seed layer 11 made of indium-tin oxide. There is provided a multilayer magneto-optic recording element 18 having alternating bilayers of Pt layer 20 and Co layer 22. The substrate is transparent in order that light from a laser or other source will illuminate the optical recording layer 15 (FIG. 2) or multilayer magneto-optic element recording element 18 (FIG. 3) as described through the grooved PC substrate 10. The multilayer magneto-optic element is formed of alternating layers of Pt layer 20 and Co layer 22. Between the grooved PC substrate 10 and the multilayered recording element 18 is a seed layer 11, which will be discussed later. Preferably, a UV curable lacquer overcoat 26 is provided on top of the multilayer magneto-optic recording element 18. An example of such a lacquer is "Daicure Clear SD-17", a UV curable acrylic resin available from Dainippon Ink and Chemicals, Inc. The lacquer is typically applied by a spin coating technique and cured in the presence of UV light. This structure is particularly suitable for use in magneto-optic disk, compact disk (CD) and photo compact disk (Photo CD).

With this type of structure, incident laser light illuminates a particular portion of the substrate, passes through the grooved PC substrate 10, and interacts with the multilayered magneto-optic recording element 18 changing the Kerr rotation. As is well known, during readout, the Kerr rotation can be monitored to indicate whether a bit has been recorded.

Seed layers made of indium-tin-oxide were prepared by d.c. sputtering a homogenous target having varying amounts of $In_2O_3$ and $SnO_2$ prepared by the hot press method. Kr gas was used for sputtering but other gases such as Ar, Xe or their mixture with or without oxygen content can be used. The sputtering pressure and deposition rate were 3 mT Kr and 0.2–1.2 nm/second, respectively. We also used other seed layers such as ZnO, Zn-Sn-O, and SiC.

Co/Pt multilayers were prepared by d.c. sputtering Co and Pt targets. The base pressure before depositing the structure was about $1\times10_{-5}$–$1\times10^{-6}$ Torr and the deposition pressure was about 40–100 mT. Alternate layers of Co and Pt were deposited onto a substrate spinning at 20–250 revolutions per minute over the Co and Pt targets. The thickness of each layer was controlled by controlling the deposition rate and the substrate rotation speed. The thickness of Co and Pt were 0.2–0.8 and 0.4–1.8 nm respectively and the number of bilayers was 2–25. The deposition was done using Kr gas but other gases such as Ar, Xe or their mixtures can be used. The PC substrates were overcoated with various surface smoothing layers which are listed in Table 1. These includes monomers such as Monomer 1 and Monomer 2, UV-curable lacquer and PMMA.

The glass described as Monomer 1 is an amide monomer similar to example 11 of U.S. Pat. No. 4,626,361 except that 1,1,3-trimethyl-5-amino-3-(p-aminophenyl)indane was condensed with 1-naphoyl chloride (50 mole %), p-bromobenzoyl chloride (16.7 mole %) and p-methoxybenzoyl chloride (33.3 mole %). It has a glass transition temperature of approximately 120° C. It's structure, is shown below.

The glass transition temperatures of these monomers can be varied by changing the concentration of the individual components present. Thin layers of the glass described as Monomer 2 were also employed. Monomer 2 is the imide monomer described in example 5 of U.S. Pat. No. 4,626,361 and has the structure shown below. It has a glass transition temperature of 190° C.

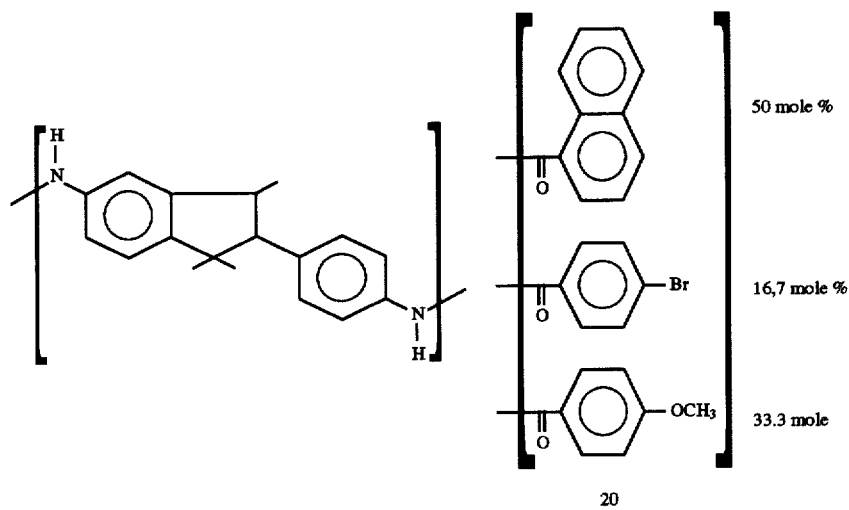

frequency, 90 ns write laser pulse, 30 kHz bandwidth, 300 Oe bias field, 0–10 mW write power and 1.5–2.0 mW read power.

Figure 4:
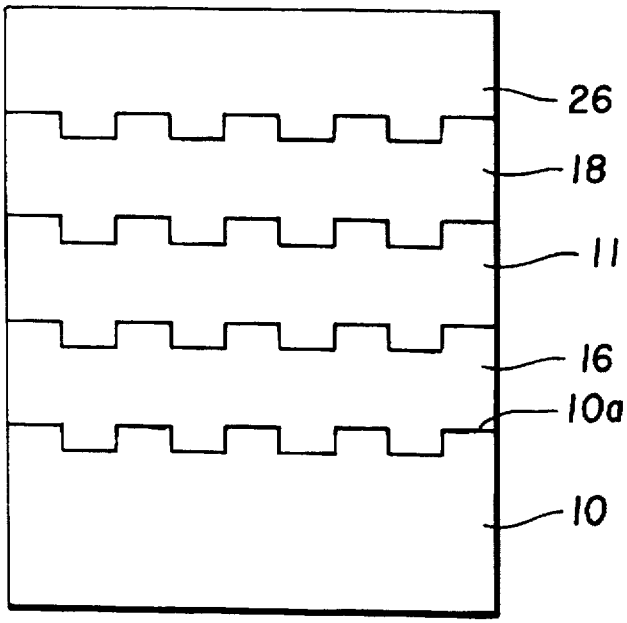
FIG. 4 is a schematic of the magneto-optical disk using a thin smoothing layer of monomers in accordance with the invention.

FIG. 4 shows a magneto-optic storage structure prepared in accordance with the present invention. This structure is similar to that of FIG. 3 except that the thin smoothing layer 16 of monomer is deposited on the substrate surface 10a.

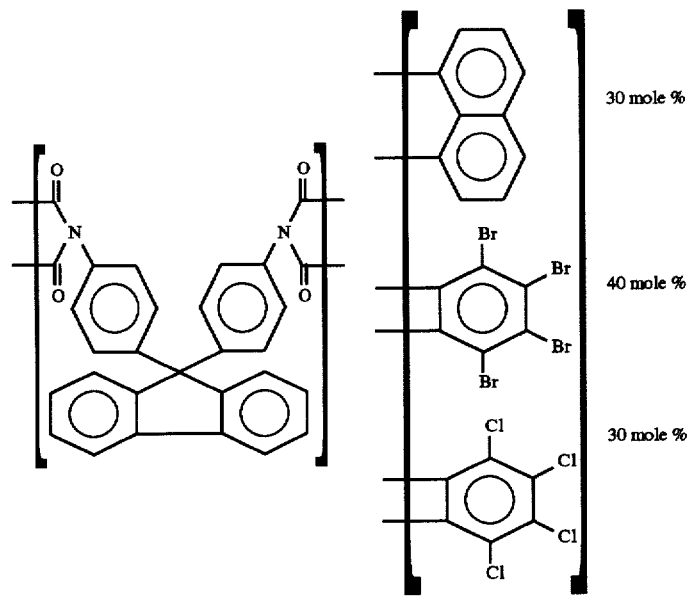

The thickness of these smoothing layers ranged from 10 nm–1000 nm and were deposited by the spin coating technique. The disks were baked in an oven at 80° C. for 24 hours to drive off any solvent left in the coating. Comparison coatings with lacquer layers substrates were cured by exposing to UV-light.

Several test samples were prepared by depositing the Co/Pt multilayers without and with surface smoothing layers. The perpendicular Kerr hysteresis loops were measured at 780 nm wavelength to obtain coercivity (Hc) and the Kerr rotation ($\theta_k$) of the structures. The dynamic measurements of the magneto-optic structures were made under the following conditions: 6.03 m/sec disk velocity, 3.87 MHz carrier The monomer are described in U.S. Pat. No. 4,626,361 issued to M. Molaire and assigned to Eastman Kodak Company. They are non-polymeric amorphous mixtures of compounds exhibiting a single thermal transition free of phase separation. Unlike polymers, they are low molecular-weight compounds without repeat units and have good layer or film forming properties.

Several full structure disks were prepared using various thicknesses of the smoothing layer and their dynamic performance was measured for carrier, noise and carrier to noise ratio. Table 1 shows describes various smoothing layers used in this invention, their thicknesses and dynamic performance data with and without smoothing layers. It was found that significantly lower noise and higher carrier to noise ratios (CNR) were obtained where the smoothing layer was a monomer such as Monomer 1 or Monomer 2. The decrease in the noise level would have been more than that shown in the Table 1, if the reflectivities of the disks with and without the smoothing layer were the same.

TABLE 1

Noise, CNR and Write-power threshold for various thicknesses of the smoothing layer

| Smoothing layer | Smoothing Layer Thickness | Noise (dBm) | CNR (dB) | Write Threshold Power (mW) |
|---|---|---|---|---|
| control disk | 0 | −44 | 46 | 4.75 |
| lacquer | 2 μm | was not able to track | | |
| PMMA | 100 nm | −43.4 | 45 | 4.75 |

TABLE 1-continued

Noise, CNR and Write-power threshold for various thicknesses of the smoothing layer

Figure 7:
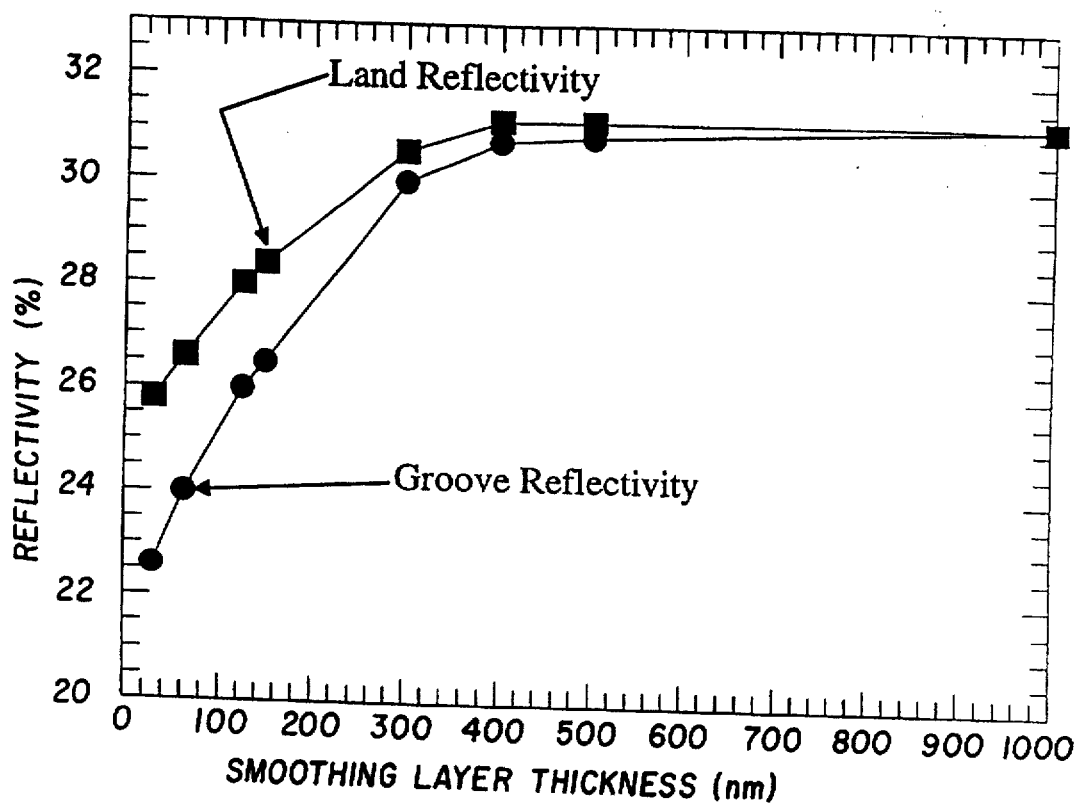
FIG. 7 is a plot of land and groove reflectivities of the Co/Pt disk as a function of a monomer smoothing layer thickness.

| Smoothing layer | Smoothing Layer Thickness | Noise (dBm) | CNR (dB) | Write Threshold Power (mW) |
|---|---|---|---|---|
| PMMA | 140 nm | −43.1 | 45 | 4.75 |
| PMMA | 200 nm | −43 | 45.1 | 4.75 |
| Monomer 1 | 8 nm | −44.2 | 46.3 | 4.75 |
| | 16 nm | −44.3 | 46.4 | 4.75 |
| | 30 nm | −44.5 | 46.7 | 4.5 |
| | 63 nm | −45.2 | 47.9 | 4.25 |
| | 126 nm | −45 | 47.9 | 4.25 |
| | 150 nm | −45 | 47.8 | 4.25 |
| | 200 nm | −45 | 48 | 4.25 |
| | 250 nm | −45.2 | 47.9 | 4.25 |
| | 300 nm | −45.1 | 48.1 | 4.25 |
| | 400 nm | −45.1 | 48.1 | 4.25 |
| | 500 nm | was not able to track | | Refer to FIG. 7 |
| | 1 μm | was not able to track | | |
| Monomer 2 | 50 nm | −45 | 47 | 4.5 |
| | 100 nm | −45 | 47.7 | 4.25 |

There was no decrease in the noise level and no improvement in the performance was obtained when the smoothing layer was lacquer or PMMA. As shown in FIG. 7 reflectivity of the disk increases with the smoothing layer. The data in Table 1 also indicate that the thickness of the monomer is preferably less than 500 nm. It was not practical to track on the grooves on the substrate when smoothing layer thickness was greater than 500 nm. The data in Table 1 also shows that the writing threshold power is lower in the disk with the monomer smoothing layer than the control disk indicating that the writing sensitivity of the disk has increased as compared to a disk without the smoothing layer.

Figure 5:
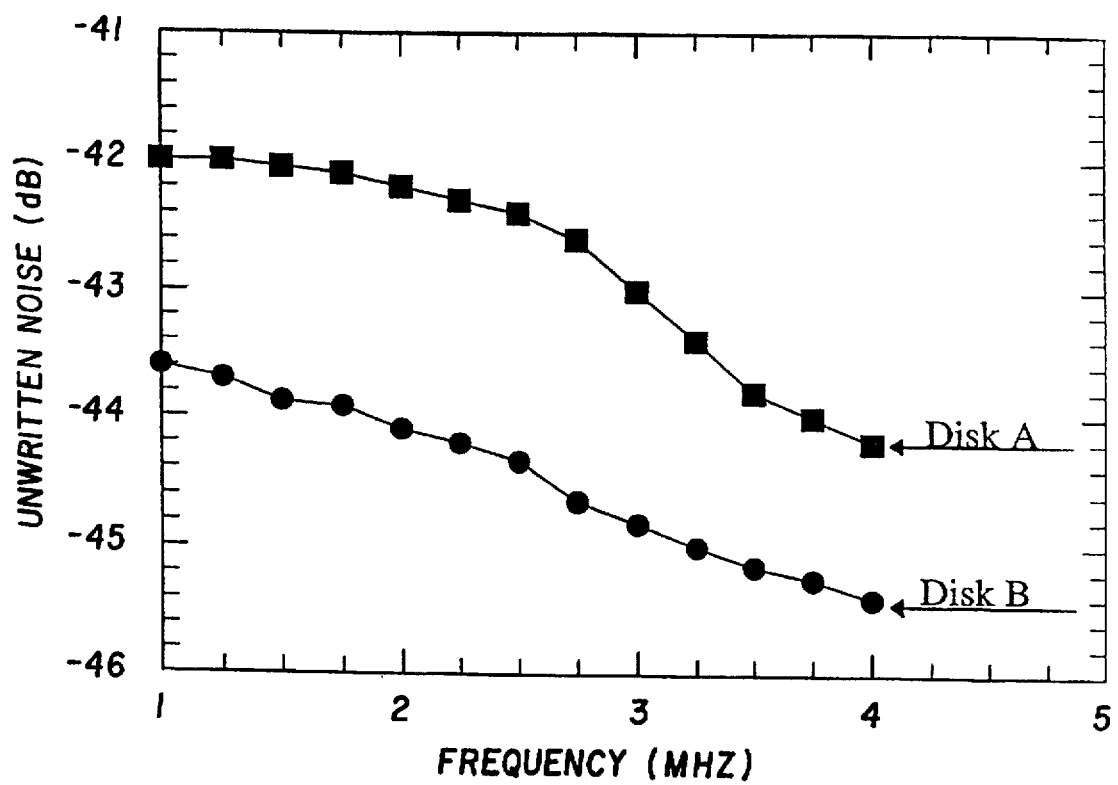
FIG. 5 shows the noise level at various frequencies for disks A without a smoothing layer and disk B with a 150 nm smoothing layer.

FIG. 5 show the comparison of the noise level of the Co/Pt disk in the recording frequency range 1–4 MHz without and with the use of a 150 nm Monomer 1 smoothing layer. These plots are labeled disk A and disk B and indicate that overall the noise level has improved by 1–2 dB throughout the spectral range.

The optical properties of the PC substrate are not affected by the smoothing layer of this invention. We measured the vertical and in-plane birefringence of the PC substrate without and with a smoothing layer. Table 2 lists the single pass birefringence of the PC substrates unbaked and after baking at 80 degrees C. for 24 hours. Essentially there is no significant change in the birefringence of the PC substrates after overcoating with a 200 nm Monomer 1 smoothing layer.

TABLE 2

Vertical and In-plane Birefringence of PC Substrates Without a 150 nm Smoothing Layer of Monomer 1

| | Vertical Birefringence w/o Monomer | Vertical Birefringence w/ Monomer | In-plane Birefringence w/o Monomer | In-plane Birefringence w/ Monomer |
|---|---|---|---|---|
| CD PC Unbaked | 563 E-6 | 559 E-6 | −5.08 E-6 | −4.94 E-6 |
| CD PC Baked | 516 E-6 | 518 E-6 | −9.31 E-6 | −8.6 E-6 |
| ISO PC Unbaked | 540 E-6 | 538 E-6 | −1.28 E-6 | −1.32 E-6 |
| ISO PC Baked | 509 E-6 | 512 E-6 | −5.24 E-6 | −5.0 E-6 |

To understand the mechanism of improvement in the noise level, we examined the substrate surfaces using high resolution scanning electron microscopy (SEM). The PC substrate without smoothing layer has numerous nano-scale defects and the surface is rough which may be contributing to the noise level. On the other hand these nano-scale defects are absent, surface roughness is reduced and the smoothness has improved in the disk with a monomer smoothing layer.

Figure 6A:
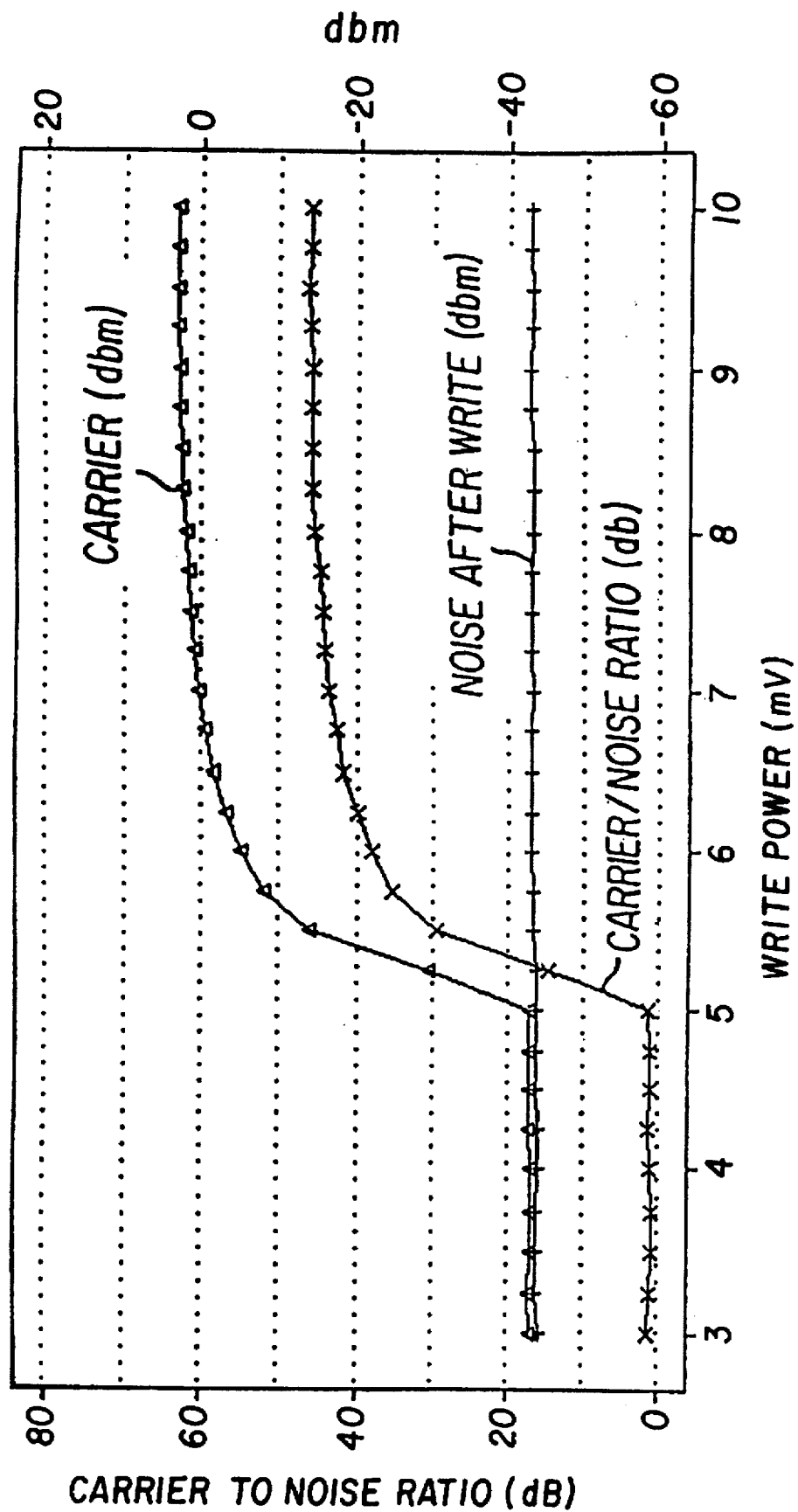
FIG. 6a shows the noise level and carrier to noise ratio as a function of write power for disk A without a smoothing layer.
Figure 6B:
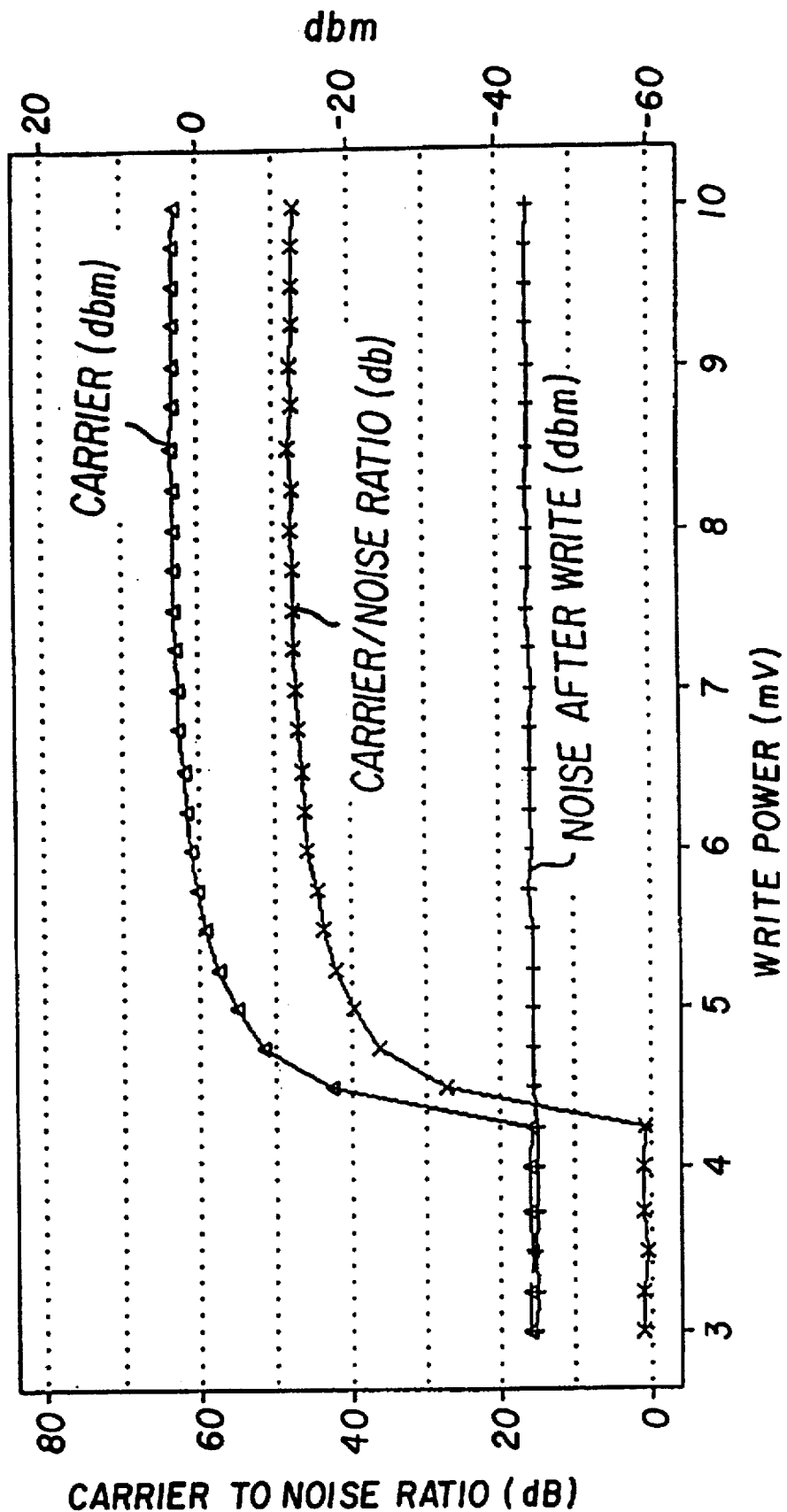
FIG. 6b shows a plot similar to FIG. 6a for disk B with a 150 nm monomer smoothing layer.

FIG. 6a and FIG. 6b show the comparison of the noise level, carrier and carrier to noise ratio as a function of write power for the two disks A and B for which data was shown in FIG. 5. Again the carrier to noise ratio is much higher for the disk with the smoothing layer due to the decrease in the noise level. Also the threshold write power is lower as compared to the disk without smoothing layer indicating that the writing sensitivity of the disk is improved. This improvement in the writing sensitivity is believed to be due to the very low thermal conductivity of the Monomer 1 smoothing layer. This smoothing layer is believed to act as a thermal barrier between the substrate and the Co/Pt MO multilayer layer.

When the MO layer is deposited on the grooved substrate, the reflectivity of the substrate is different at the land and in the groove. The difference in the signal intensity from the land and the groove (Il−Ig), generates tracking signals used for tracking purposes. The MO disk should meet certain specifications for push pull signal defined as $(I_1-I_2)/I_o$, as described in the standard ISO test conditions for MO media, where $(I_1-I_2)$ is the differential output from the split photo diode detector in the optical head and $I_o$ is the signal obtained from the ungrooved and unrecorded portion of the track. FIG. 7 shows a plot of the land and groove reflectivities as a function of smoothing layer thickness. It indicates that land and groove reflectivities maintain a large difference when there is no smoothing layer but this difference decreases with increasing smoothing layer thickness and finally both reflectivities are equal when the smoothing layer exceeds 500 nm. At this point groove tracking is not possible thus limiting the thickness of the smoothing layer.

Figure 8:
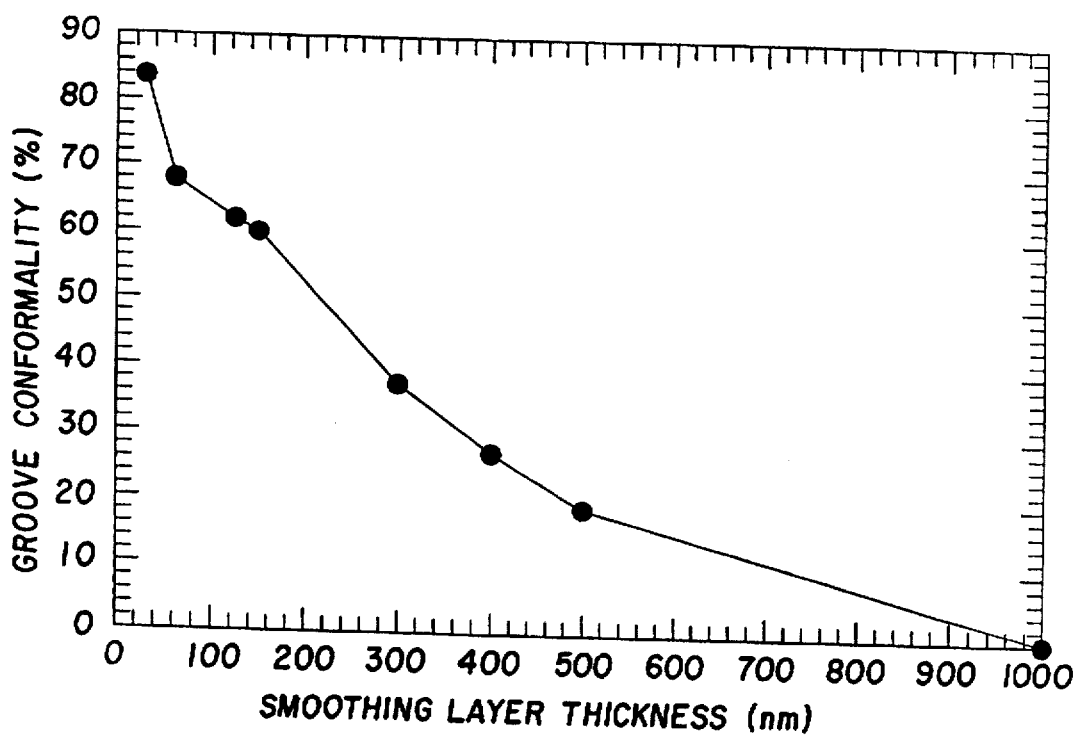
FIG. 8 is a plot of conformality of the Co/Pt disk as a function of smoothing layer thickness.

Also we measured groove conformality as a function of the smoothing layer thickness. The conformality is defined as the ratio of the groove depth of the PC substrate with a smoothing layer and without a smoothing layer. High conformality is required for tracking on the grooves. FIG. 8 shows that the conformality decreases with increasing thickness of the smoothing layer. In fact it reaches less than 20% when smoothing layer thickness exceeds 500 nm, thus limiting the thickness of this layer.

In the above examples, results were described using MO medium as an optical recording medium and Monomer 1 and Monomer 2 monomers as smoothing layers. Other optical recording layers as well as other monomers with varying glass transition temperatures could also be used.

The invention has been described in detail with particular reference to certain preferred embodiments thereof, but it will be understood that variations and modifications can be effected within the spirit and scope of the invention.

PARTS LIST

- 10 grooved PC substrate
- 10a substrate surface
- 11 seed layer
- 15 optical recording layer
- 16 thin smoothing layer
- 18 multilayer magneto-optic recording element
- 20 Pt layer
- 22 Co layer
- 26 UV curable lacquer overcoat

We claim:

1. An optical recording medium comprising:
   a) a substrate with grooves;
   b) a surface smoothing layer less than 1 μm thick deposited on the grooved substrate wherein the said surface smoothing layer includes monomers selected from the group consisting of:

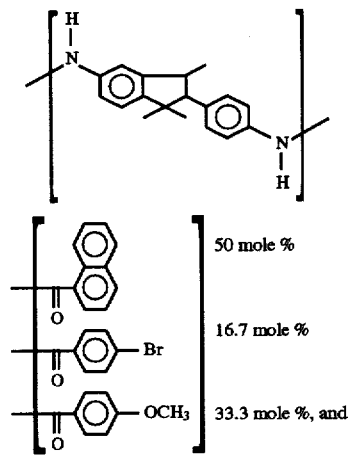

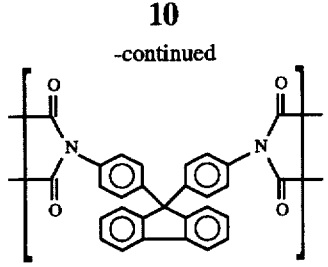

, and c) a recording layer.

2. The optical recording medium of claim 1 wherein the said recording layer is a magneto-optical structure.

3. The optical recording medium of claim 1 wherein the said recording layer is a Co/Pt multilayer film consisting of alternating layers of Co/Pt.

4. The optical recording medium of claim 3 wherein a seed layer is deposited onto the said smoothing layer.

5. The optical recording medium of claim 3 wherein the said multilayer film contains 2–25 bilayers of Co and Pt, the thickness of each of Co and Pt layer being uniform and between 0.2 to 0.8 nm and 0.4 to 1.8 nm respectively.

6. The optical recording medium of claim 1 wherein a seed layer is deposited onto the said smoothing layer.

7. The optical recording medium of claim 6 wherein said smoothing layer has a thickness of 20–500 nm and is selected to improve the noise level and performance of the optical disk.

8. The optical recording medium of claim 7 further providing an UV curable lacquer overcoat on the recording layer.

9. The optical recording medium of claim 1 wherein said smoothing layer has a thickness of 20–500 nm and is selected to improve the noise level and performance of the optical-disk.

10. The optical recording medium of claim 1 wherein the said surface smoothing layer maintains conformality greater than 20% to the substrate grooves.

11. The optical recording medium of claim 1 wherein the said surface smoothing layer maintains conformality greater than 20% to the substrate grooves.

12. The optical recording medium of claim 1 further providing an UV curable lacquer overcoat on the recording layer.

* * * * *

UNITED STATES PATENT AND TRADEMARK OFFICE
CERTIFICATE OF CORRECTION

PATENT : 5,700,540

DATED : December 23, 1997

INVENTOR(S) : Giuseppe Farruggia, et al.

It is certified that error appears in the above-identified patent and that said Letters Patent is hereby corrected as shown below:

On the title page, insert the following:
  –Related U.S. Application Data
[60] Provisional application No. 60/009,420, Nov. 13, 1995–.

Column 1, line 4, insert --Reference is made to and priority claimed from U.S. provisional application ser. no. U.S. 60/009,420, filed Nov. 13, 1995, entitled AN RECORDING MEDIUM --.

Signed and Sealed this

Fourteenth Day of July, 1998

*Attest:*

BRUCE LEHMAN

*Attesting Officer*    *Commissioner of Patents and Trademarks*